United States Patent [19]

Speakman

[11] 4,195,558
[45] Apr. 1, 1980

[54] FUEL CONSUMPTION CONTROL SYSTEM FOR COOKING MACHINES

[76] Inventor: Thomas S. Speakman, 3318 Stoudt's Ferry Bridge Rd., Reading, Pa. 19605

[21] Appl. No.: 851,278

[22] Filed: Nov. 14, 1977

[51] Int. Cl.² ............................................. A47J 27/62
[52] U.S. Cl. ................................................. 99/325
[58] Field of Search ................................. 99/325–329, 99/331–334, 443 C; 426/231, 503; 219/388, 388 C; 431/36, 37, 49, 75; 432/51, 57; 481/73; 364/40.2, 40.6, 40.7; 425/135, 143, 160; 126/39 G

[56] References Cited

U.S. PATENT DOCUMENTS

| | | | |
|---|---|---|---|
| 2,043,991 | 6/1936 | Dalen et al. | 431/37 |
| 2,436,575 | 2/1948 | Johnson | 99/326 |
| 2,635,683 | 4/1953 | Klein | 431/49 |
| 2,965,015 | 12/1960 | Huchok | 99/327 |
| 3,262,486 | 7/1966 | Rose | 431/75 |
| 3,488,133 | 1/1970 | Perl | 431/75 X |
| 3,570,391 | 3/1971 | Rejler | 99/326 |
| 3,635,018 | 1/1972 | DeCorso et al. | 431/75 X |
| 3,765,820 | 10/1973 | Ito et al. | 431/75 |
| 3,827,345 | 8/1974 | Willson | 99/325 |
| 3,870,859 | 3/1975 | Price | 219/388 X |
| 3,965,322 | 6/1976 | Mori | 99/325 X |
| 3,972,275 | 8/1976 | Schweig et al. | 99/326 |
| 4,044,660 | 8/1977 | Montague et al. | 99/326 |

*Primary Examiner*—George F. Mautz
*Assistant Examiner*—Arthur O. Henderson

[57] ABSTRACT

A system for controlling and reducing the consumption of fuel by gas-fired cooking machines of the type that use a conveyor or like means to move food products such as hamburgers through a heated zone for cooking. The control system includes means for providing a sufficiently high rate of flow of gas to the cooking machine to permit proper cooking, a timer to maintain the high rate of gas consumption during the time the food products are in the cooking zone and, means for reducing the consumption of gas after the food products have exited from the cooking zone, said reduced consumption of gas is sufficiently high to maintain the cooking machine in a state of readiness so that it can respond quickly to the need to cook additional food products.

9 Claims, 2 Drawing Figures

FUEL CONSUMPTION CONTROL SYSTEM FOR COOKING MACHINES

BACKGROUND OF THE INVENTION

1. Field of the Invention

This invention relates to a method and apparatus for controlling the consumption of fuel by cooking machines and more particularly by gas-fired cooking machines that control the duration of cooking time by means for moving food products into a heated cooking zone and removing them after a predetermined time interval.

2. Description of the Prior Art

Cooking machines of a wide variety of configurations are known. Known fuel controls for these cooking machines are generally manual types or automatic types. The automatic types of controls are generally either temperature dependent or time dependent. The temperature dependent controls either vary the fuel consumption rate to maintain a predetermined temperature in a cooking chamber or turn off the fuel after the temperature of the cooking chamber or the food product reaches a predetermined temperature. The time dependent controls generally control the duration of the cooking cycle by turning off the fuel after a predetermined time interval.

None of these controls has been entirely satisfactory for a type of cooking machine that is in widespread usage and known as an automatic gas-fired broiler. This type of cooking machine utilizes gas burners to produce radiant heat, direct impingement of flames, hot combustion gases or a combination of these to rapidly cook hamburgers and similar food items and typically utilizes a conveyor or some similar means to support the food items and move them through a heated zone for cooking. The duration of the cooking cycle is predetermined by the length of the heated zone and the speed of the conveyor. This type of cooking machine is in particular widespread usage in restaurants and other eating establishments that specialize in hamburgers and other food products that must be prepared to a delicious and edible condition in a relatively short time such as in a matter of seconds. It is important in such establishments to be able to do the cooking with a minimum of operator attention and labor and to do the cooking as automatically as possible so that the employees can spend most of their time taking and filling orders. It is considered undesirable to cook such food products in advance and store them until needed to fill a customer's order because the products tend to loose flavor during storage and are less desirable to the customer. Because of this it is common practice in such establishments to cook the food products only in response to the need to fill an order for a customer and thus enable the food to be served within a short time after it exits from the cooking machine. Due to the fluctuating nature of customer demand for food service, some periods of time exist when hamburgers or other food products are being processed through the cooking machine and other, irregular, periods of time exist when the cooking machine is idle with no food products being processed. During the idle periods it is desirable to keep the cooking machine in a state of readiness so that it is immediately available to process food products in response to the need to fill customer orders.

Known automatic cooking machines maintain the state of readiness during idle periods by maintaining the consumption of gas at essentially the same rate during idle periods as it is during periods when food products are being processed through the machine. These known machines accomplish the objective of being able to respond quickly to customer demands because they operate continuously. However, they are very wasteful in terms of energy usage and contribute substantially to the gas utility costs for the establishments that use them. The gas that is consumed during the idle periods is largely wasted because the gas consumption rate that is required to rapidly cook hamburgers and similar food products greatly exceeds the gas consumption rate that is needed to keep the cooking machine in a state of readiness during the idle periods. In a typical restaurant or other establishment that uses automatic cooking machines of this type, the irregular idle periods when no food products are being processed, when taken in their entirety, amount to a substantial proportion of the time that the automatic cooking machine is in operation. Thus the quantity of gas wasted during the idle periods is a substantial proportion of the total quantity of gas consumed by the cooking machine. The gas flow adjustment devices on known cooking machines are essentially manually operated. Attempts have been made to manually reduce the gas flow during idle periods with these manual flow adjustment devices and then to manually readjust the flow rate to the level needed to properly cook food products upon receipt of a customer order but, these attempts have not been satisfactory. This procedure degrades some the major advantages of the cooking machines, first by using employees' time to frequently adjust the gas flow and additionally by slowing down the response time to customer demand because the gas flow rate must be manually readjusted before food products can be processed through the cooking machine.

SUMMARY OF THE PRESENT INVENTION

The present invention overcomes these and other disadvantages and shortcomings of prior art by providing a gas consumption control system for cooking machines that permits all the advantages of these machines to be realized including rapid cooking of hamburgers and similar food products, fast response to customer demand, ease of operation by relatively unskilled employees and, cooking with a minimum of operator time and labor and; provides the added advantage of a substantial reduction in the total consumption of gas by the cooking machines.

To accomplish this, the present invention includes gas flow adjustment means including an electrically operated solenoid valve which, in one mode of operation, provides a sufficiently high rate of gas flow to gas burners of the cooking machine to provide proper cooking and, in a second mode of operation, causes the gas to flow through a restricted passage and thus reduces the rate of flow of gas, a timer control to maintain the high rate of gas flow during the time period when food products are being processed through the cooking machine and, means for providing a start signal to the timer when the need arises to process a food product through the cooking machine. The present fuel consumption control system thus provides a high rate of consumption of gas during those periods of time when it is needed to cook food products and a reduced consumption of gas during idle periods when no food products are being processed and, accomplishes this in an automatic fashion with little operation intervention.

It is therefore an object of the invention to provide a fuel consumption control system for gas fired cooking machines that reduces the consumption of gas by the cooking machine during the idle time periods when no food products are being processed through the cooking machine.

A further object is to provide a control system that maintains the gas consumption during the idle periods at some predetermined level that will assure the cooking machine is in a state of readiness to be able to respond quickly to the need to process food products through the cooking machine.

A further object is to provide a control system that responds quickly to the need to process food products through the cooking machine by increasing the gas consumption to the level necessary for proper cooking.

A further object is to provide a control system that maintains the increased gas consumption needed for proper cooking for a sufficient length of time to permit the cooking cycle to be terminated by the cooking machine.

A further object is to provide a control system that automatically reduces the consumption of gas after a predetermined interval without operator intervention.

Another object is to provide a control system that is readily operable by unskilled people.

Another object is to provide a control system that can be operated with a minimum of time and labor.

A further object is to provide a control system that can be installed on, incorporated into or used in conjunction with cooking machines of a wide variety of designs and configurations and thereby impart the benefits of this invention to those machines.

These and other objects and advantages of the present invention will become apparent after considering the following description and the accompanying drawings.

DESCRIPTION OF THE PREFERRED EMBODIMENTS

In the following description, certain specific terms are used to describe the various components and parts in the interest of clarity. It is to be understood that any such specific terms are intended to include all technical equivalents that perform the same function.

Figure 1:
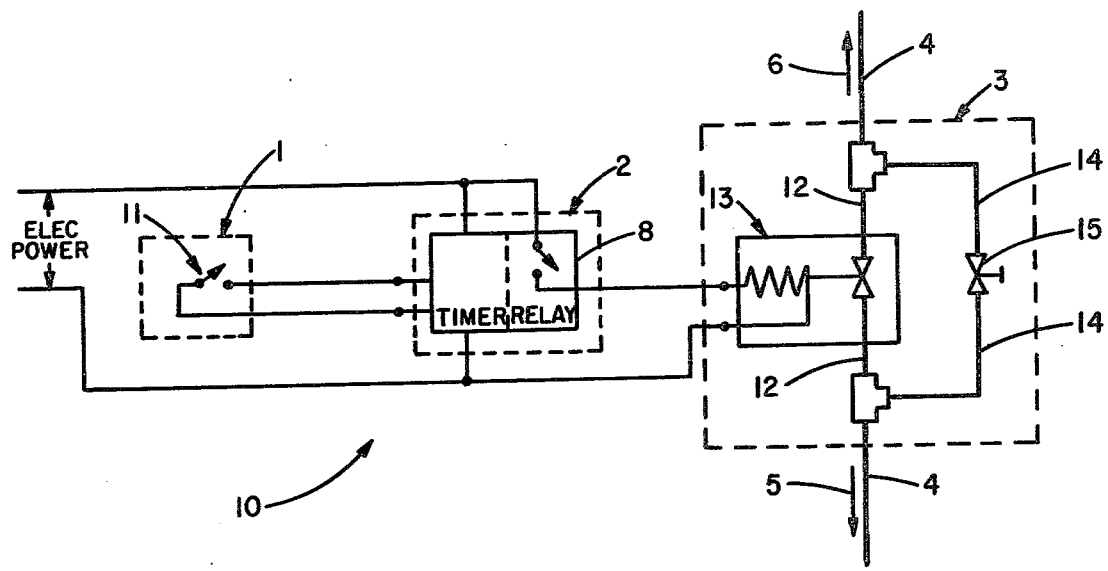
FIG. 1 is a schematic representation of the functional components of a fuel consumption control system in accordance with this invention.
Figure 2:
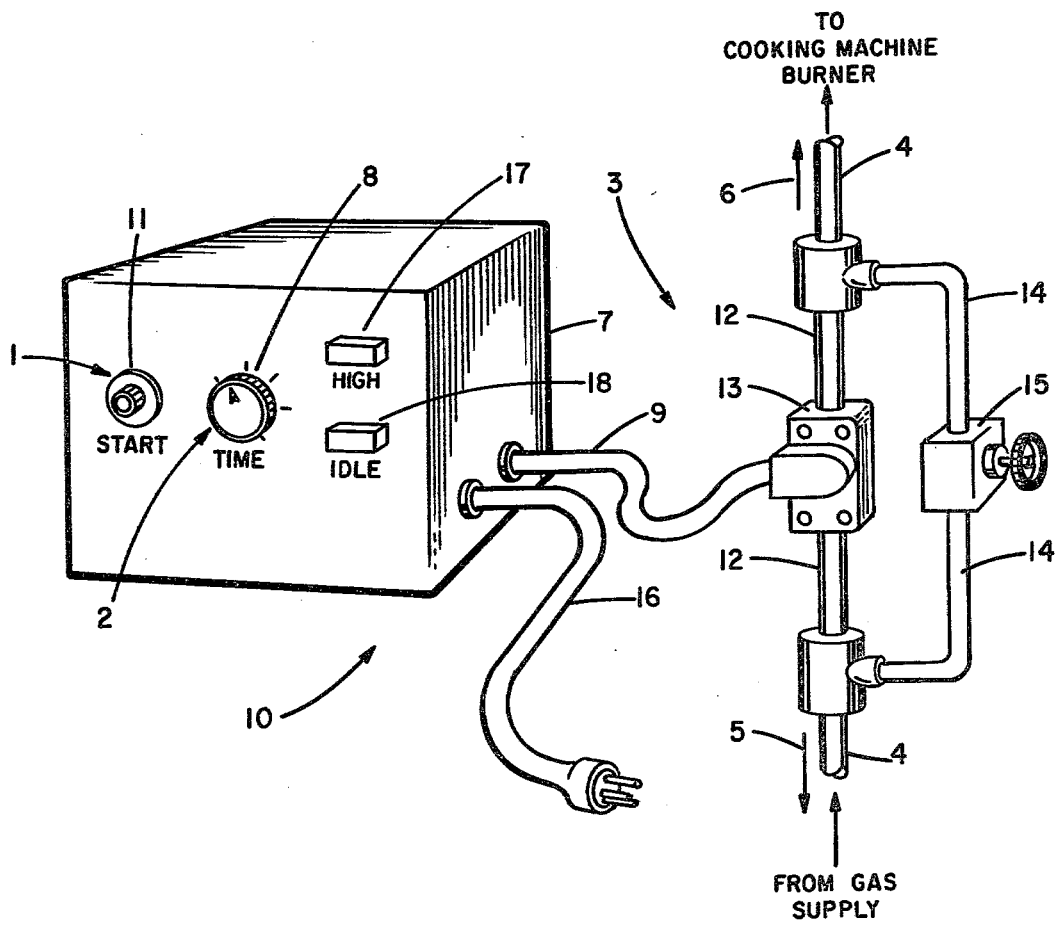
FIG. 2 is a perspective view of a fuel consumption control system constructed pursuant to the invention.

Referring to the drawings more particularly by reference numbers, number 10 in FIG. 1 and FIG. 2 refers generally to a fuel consumption control system constructed according to the present invention for use with an automatic cooking machine (not shown) of the type that utilizes the combustion of gas to rapidly cook hamburgers and like food products and additionally of the type that controls the duration of the cooking cycle by moving the food products into a heated cooking zone and automatically removing them from the cooking zone after a predetermined time period, typically by utilizing a conveyor or like means for moving the food products through the cooking zone. The control system 10 includes in combination a start signal means 1, a timing means 2 and a gas flow adjustment means 3. The start signal means 1 is connected in electrical communication with timing means 2 and has the capability of transmitting a start signal to timing means 2. Timing means 2 is connected in electrical communication with gas flow adjustment means 3 and has the characteristics that upon receival of a start signal means 1, it will immediately transmit a first electrical signal to gas flow adjustment means 3 and will begin timing a predetermined interval of time and, substantially at the end of said predetermined interval of time, will transmit a second electrical signal to gas flow adjustment means 3. The gas flow adjustment means 3 is disposed in series with a gas supply conduit 4 which extends in one direction 5 to the usual source of gas (not shown) and in another direction 6 to one or more burners (not shown) of the cooking machine. The gas flow adjustment means 3 has the characteristics that upon receival of the first electrical signal from timing means 2, it will increase the rate of gas flow through gas supply conduit 4 to a first rate of flow and, upon receival the second electrical signal from timing means 2, it will reduce the rate of gas flow through gas supply conduit 4 to a second rate of flow.

The start signal means 1 as shown in FIG. 2 is a manual pushbutton switch 11 of the customary type mounted in a housing 7 and connected in electrical communication with timing means 2.

The timing means 2 as shown is the customary combination of an electric timer and an electromechanical relay that is available commercially and known as a time delay relay 8 which is mounted in housing 7 and connected in electrical communication with gas flow adjustment means 3 through an electrical cable 9.

The gas flow adjustment means 3 as shown includes a first gas conduit 12 with a solenoid valve 13 disposed in series therewith and connected to electrical cable 9 and a second gas conduit 14 disposed essentially in parallel with the first gas conduit 12 and connected at one end in open communication with one end of the first gas conduit 12 and with the gas supply conduit 4 in the direction 5 that extends to the supply of gas and connected at the other end in open communication with the other end of the first gas conduit 12 and with gas supply conduit 4 in the direction 6 that extends to the cooking machine burners (not shown). The gas flow adjustment means 3, thus constructed, will permit gas to flow in parallel fashion through the first gas conduit 12 and the second gas conduit 14 when solenoid valve 13 is open and will cause gas to flow only through the second gas conduit 14 when the solenoid valve 13 is closed. Gas flow from the gas supply to the cooking machine burners through gas supply conduit 4 encounters a greater resistance to flow when solenoid valve 13 is closed resulting in a reduced flow rate. In practicing this invention, the size of the second gas conduit and the resulting resistance to flow provided thereby is chosen to provide the proper flow rate of gas to the cooking machine burners when solenoid valve 13 is closed to maintain the cooking machine in a state of readiness to be able to respond quickly to the need to process food products through the cooking machine. The flow rate required to accomplish this is dependent upon characteristics of the cooking machine with which the present invention is used and will differ with different configurations of cooking machines. Therefore, in the preferred embodiment, the second gas conduit 14 includes a regulating valve 15 disposed in series therewith for adjusting the flow rate of gas to meet the needs of the cooking machine. Additionally, in practicing this invention, the size of the first gas conduit 12 and the resulting resistance to gas flow is chosen such that the gas flow rate through the parallel combination of the first gas conduit 12 and the second gas conduit 14, when solenoid valve 13 is open, is sufficiently high to provide for proper cooking of food products that are processed through the cooking machine.

Electrical power for the gas consumption control system 10 is provided by a customary power cord 16. Optionally, indicator lights 17 and 18 are included to provide a visual indication of the state of operation of the control system 10.

In operation, during idle time periods when no food products are in process through the cooking machine, solenoid valve 13 is closed. The gas is thereby caused to flow through the second gas flow conduit 14, thus establishing a rate of consumption of gas by the cooking machine burners that is at the proper level to maintain the cooking machine in a state of readiness to be able to respond quickly to the need to process food products through the cooking machine. When it is desired to process a hamburger or like food product through the cooking machine, the operator of the cooking machine places the food product on a conveyor or like means of the cooking machine used to transport food products through a cooking zone of the cooking machine. The operator also immediately activates the manual pushbutton switch 11 of the present invention which transmits a start signal to the time delay relay 8. The time delay relay 8 immediately transmits a first electrical signal to solenoid valve 13 causing it to open. This results in an increased gas flow rate to the cooking machine burners, that is sufficiently high to provide for proper cooking of the food product. Upon receival of the start signal from the pushbutton switch 11, the time delay relay 8 also begins timing a predetermined interval of time, said predetermined interval of time having previously been set to approximately equal or slightly exceed the length of time required by the cooking machine to process a food product through the cooking zone of the cooking machine. At the end of said predetermined interval of time, time delay relay 8 transmits a second electrical signal to solenoid valve 13 causing it to close, thereby reducing the consumption of gas by the cooking machine burners to the level required during idle periods. The gas consumption control system 10 maintains the gas consumption at this reduced level until the pushbutton switch 11 is again activated.

If it is desired to process additional food products through the cooking machine while a first food product is in process, the cooking machine operator activates the manual pushbutton switch 11 again which transmits another start signal to the time delay relay 8. Time delay relay 8 begins timing the predetermined interval of time again thereby providing sufficient time for the additional food items to process through the cooking zone before solenoid valve 13 closes.

The fuel consumption control system thus provides the high rate of gas consumption required for proper cooking during the time periods when food products are being processed through the cooking machine, and provides a reduced rate of gas consumption during idle time periods. The control system 10 therefore fulfills the primary objective of reducing the total consumption of gas by the cooking machine. Proper sizing and adjustment of the gas flow adjustment means 3 provides the proper rate of consumption of gas during idle periods to keep the cooking machine in a state of readiness able to respond quickly to the need to process food products and, during time periods when food products are being processed, provides a sufficiently high rate of gas consumption to provide for proper cooking. The solenoid valve 13 provides the quick response required and eliminates the need for frequent manual adjustment. Time delay relay 8 maintains the gas consumption at the rate needed for proper cooking for a sufficient length of time to permit the cooking cycle to be terminated by the cooking machine, then automatically reduces the rate of consumption, thereby fulfilling the need to permit the cooking machine to control the cooking cycle and endowing the control system 10 with the ability to control gas consumption automatically with a minimum of operator intervention. The manual pushbutton switch 11 as described in the preferred embodiment provides for a minimum of operator time and labor to operate the control system and provides the additional advantage of minimizing the cost and complexity of the control system 10. The manual pushbutton switch 11 can be substituted with an automatic switch that is capable of detecting the presence of food products in the cooking machine if it is desired to eliminate the activation of the start signal means 1 by an operator at the expense of added cost and complexity. Many suitable automatic switches for this purpose are known and available commerically including photo cell switches and pneumatic proximity switches.

The control system 10 as described is readily usable with a wide variety of existing and new cooking machines. The user need only install the gas flow adjustment means 3 in series with a gas supply conduit 4 that supplies gas to the cooking machine burners and connect power cord 16 to a suitable source of electric power.

It is to be understood that the form of the invention herein shown and described is to be taken as a preferred embodiment. Various changes may be made in the shape, size and arrangement of parts. For example, equivalent elements may be substituted for those illustrated and described herein without departing from the spirit or scope of the invention as defined in the subjoined claims. Control systems constructed in accordance with this invention may have another type of signaling device such as a photo cell or a switch that is activated by the presence of a food product in the cooking machine substituted for the manual pushbutton switch of the start signal means heretofore described. Accordingly, it is to be understood that the term start signal means as used in the subjoined claims includes all such equivalents for the purposes of the control system of this invention.

Having thus described my invention, I claim:

1. An apparatus for controlling the consumption of gas by a cooking machine comprising a heated cooking zone, at least one gas burner for suppling heat to the cooking zone, a gas supply conduit for supplying a flow of gas to the gas burner and extending from the gas burner to a customary source of gas and, said apparatus comprising:

means for providing an electrical start signal when a food product enters or is anticipated to enter the cooking zone of the cooking machine;

means for timing a predetermined interval of time and transmitting control signals, connected in electrical circuit with said start signal means and responsive to said start signal, said control signals comprising a first control signal transmitted essentially at the time of receival of said start signal and a second control signal transmitted essentially at the end of said predetermined interval of time and;

means for adjusting the flow of gas, disposed in series with the gas supply conduit of the cooking machine, connected in electrical circuit with said timing means and responsive to said first control signal by increasing the flow of gas through said gas supply conduit to a first rate of flow and responsive to said second control signal by reducing the flow of gas through said gas supply conduit to a second rate of flow wherein said second rate of flow is lower than said first rate of flow, said adjusting means comprising a first gas conduit with a solenoid valve disposed in series therewith and connected in electrical circuit with said timing means and, a second gas conduit including means restricting the flow of gas disposed essentially in parallel with said first gas conduit and connected at one end in open communication with a first end of said first gas conduit and with the gas supply conduit of the cooking machine in the direction that extends to the source of gas and connected at the outer end in open communication with the second end of said first gas conduit and with said gas supply conduit in the direction that extends to the gas burner of the cooking machine.

2. An apparatus as in claim 1 wherein said first rate of flow produces a rate of consumption of gas by the gas burner of the cooking machine that is sufficient to properly cook said food product during said predetermined interval of time.

3. An apparatus as in claim 1, wherein said second rate of flow produces a rate of consumption of gas by the gas burner of the cooking machine that maintains said cooking machine in a state of readiness able to respond quickly to a need to process said food product.

4. An apparatus as in claim 1 wherein said start signal means includes an electrical switch.

5. An apparatus as in claim 1 wherein said start signal means includes a sensing means for detecting the presence of said food product before or essentially at the time of entrance of said food product into the cooking zone of the cooking machine.

6. An apparatus as in claim 5 wherein said sensing means includes a detector responsive to fluctuations in air pressure.

7. An apparatus as in claim 5 wherein said sensing means includes a photo cell detector.

8. An apparatus as in claim 1 wherein said timing means includes a time delay relay.

9. An apparatus as in claim 1 wherein said second gas conduit includes means for adjusting the resistance to flow of gas disposed in series therewith.

* * * * *